US008177152B2

(12) United States Patent
Harmon

(10) Patent No.: US 8,177,152 B2
(45) Date of Patent: May 15, 2012

(54) ASPHALT SHINGLE RECYCLING SYSTEM

(75) Inventor: Thomas B. Harmon, Odessa, FL (US)

(73) Assignee: GRD1, LLC, Odessa, FL (US)

( * ) Notice: Subject to any disclaimer, the term of this patent is extended or adjusted under 35 U.S.C. 154(b) by 0 days.

(21) Appl. No.: 13/065,025

(22) Filed: Mar. 11, 2011

(65) Prior Publication Data
US 2011/0266381 A1 Nov. 3, 2011

Related U.S. Application Data

(62) Division of application No. 12/381,192, filed on Mar. 9, 2009, now Pat. No. 7,913,940.

(51) Int. Cl.
B02C 19/00 (2006.01)
(52) U.S. Cl. ........................ 241/65; 241/101.8
(58) Field of Classification Search ............... 241/101.8, 241/65, 66, 67; 366/24
See application file for complete search history.

(56) References Cited

U.S. PATENT DOCUMENTS

| | | | | |
|---|---|---|---|---|
| 4,169,680 A | * | 10/1979 | Littlefield | 366/139 |
| 4,345,013 A | * | 8/1982 | Diamond et al. | 430/106.2 |
| 4,662,570 A | * | 5/1987 | Heeren et al. | 241/79.1 |
| 5,201,472 A | * | 4/1993 | Brock | 241/22 |
| 5,848,755 A | * | 12/1998 | Zickell et al. | 241/65 |
| 6,588,973 B1 | * | 7/2003 | Omann | 404/17 |

* cited by examiner

Primary Examiner — Mark Rosenbaum
(74) Attorney, Agent, or Firm — William E. Johnson, Jr.

(57) ABSTRACT

The asphalt roofing material is delivered into a treatment chamber of a processor. Hot oil is passed through a jacket surrounding the treatment chamber. Heated asphalt forms a hot solid and/or a liquefied slurry. The hot solid and/or the liquefied slurry is then removed from the treatment chamber. The asphalt roofing material in the treatment chamber can be agitated to promote mixing. The asphalt is heated to a temperature in the range from 200 degrees Fahrenheit to 650 degrees Fahrenheit within the treatment chamber. The solid and/or liquefied slurry is milled after it has been removed from the treatment chamber. The solid and/or the liquefied slurry is cooled after it exits the treatment chamber, preferably to a temperature in the range of approximately 90 degrees Fahrenheit to 110 degrees Fahrenheit. The hot solid and/or the liquefied slurry is passed through a hammer mill after the hot solid and/or the liquefied slurry exits the treatment chamber to reduce the particle size of the solid particles.

6 Claims, 4 Drawing Sheets

ASPHALT SHINGLE RECYCLING SYSTEM

RELATED APPLICATIONS

This application is a Divisional application coming out of, and claiming priority from U.S. patent application Ser. No. 12/381,192, filed on Mar. 9, 2009, for Asphalt Shingle Recycling System and Method, and also claiming priority from U.S. Provisional Patent Application Serial No. 91/069,435, filed on Mar. 14, 2008, for Asphalt Shingle Recycling System and Method.

BACKGROUND

1. Field of Invention

The invention relates generally to recycling of asphalt shingles, and in particular, to a system and method for recycling of asphalt shingles utilizing heat treatment.

2. Description of Art

Asphalt concrete pavement is commonly used in roadway construction. The asphalt concrete pavement typically comprises liquid asphalt cement combined with aggregate. The aggregate is usually a mixture of sand, gravel, and stone. The aggregate and liquid asphalt cement are mixed and heated to form an asphalt paving composition. The crushed gravel and stone particles of the aggregate provide sharp edges which, when combined with the liquid asphalt cement, create an aggregate interlock which improves the strength of the composition.

Liquid asphalt cement can be expensive. Shredded asphalt roofing shingles are often used as a substitute for liquid asphalt cement. The asphalt roofing shingles are sometimes "recycled" and incorporated into the asphalt pavement composition.

It is difficult to regulate the consistency of the asphalt pavement composition produced by existing recycling processes. Also, air emissions from existing recycling processes can be detrimental to the atmosphere.

SUMMARY OF THE INVENTION

In accordance with the illustrative embodiments hereinafter described, a system and method for recycling asphalt roofing shingles is described. Scrap and tear-off shingles from roofing materials are heat treated to form a hot solid and/or liquefied to produce a slurry that can be formed into a finished product. The content of the hot solid or liquid slurry can be regulated with a relatively high degree of consistency. Further, many of the air emission concerns that existed in previous asphalt shingle recycling processes are eliminated.

In one particular embodiment, a method of recycling asphalt roofing material is provided. The asphalt roofing material is delivered into a treatment chamber of a processor. A heat source is passed through a jacket that at least partially surrounds the treatment chamber. Heat energy is transferred from the heat source to the asphalt roofing material until the asphalt roofing material forms a hot solid or a liquefied slurry. The liquefied slurry or the hot solid is then removed from the treatment chamber. Heated oil can be used as the heat source. Asphalt can be added to the asphalt roofing material if desired. The asphalt roofing material in the treatment chamber can be agitated to promote mixing. The asphalt roofing material can be heated to a temperature in the range from 200 degrees Fahrenheit to 650 degrees Fahrenheit, preferably to about 350 degrees Fahrenheit within the treatment chamber. The liquefied slurry or the hot solid can be milled after it has been removed from the treatment chamber to form a final recycled product. The liquefied slurry or the hot solid can be cooled after it exits the treatment chamber, preferably to a temperature in the range of approximately 90 degrees Fahrenheit to 110 degrees Fahrenheit. The liquefied slurry or the hot solid can be passed through a hammer mill after the liquefied slurry or the hot solid exits the treatment chamber.

In another aspect, a processor for recycling asphalt roofing material is provided. The processor can include a treatment chamber, an inlet disposed on the treatment chamber for allowing untreated asphalt roofing material to enter the treatment chamber, an outlet disposed on the treatment chamber for allowing treated asphalt roofing material to exit the treatment chamber, and a jacket at least partially surrounding the treatment chamber, the jacket having a outer wall, an inner wall, and a passageway therebetween for allowing a heat source to pass therethrough. A feature of the processor is that an agitator arm can be disposed within the treatment chamber. The agitator arm can have a shaft and one or more paddles positioned thereon that contact the contents of the treatment chamber. A screw conveyer can be disposed adjacent to the inlet for delivering untreated asphalt roofing material to the treatment chamber. The screw conveyer can include a plurality of variable speed conveyors for regulating the flow of untreated asphalt roofing material to the treatment chamber, the heat source can be heated oil, and the heated oil can circulate through the jacket.

In another aspect, an apparatus for recycling asphalt roofing material is provided. The apparatus can include a jacketed agitated processor for heating the asphalt roofing material to produce either a hot solid or a partially or completely liquefied product, a heating skid for supplying a heat source to the jacket of the agitated processor, and a hammer mill for reducing the particle size of solid particles present in the hot solid or the partially liquefied product. The apparatus can also include a sizing unit for reducing the particle size of solid particles present in the hot solid or the partially liquefied product before the hot solid or the partially liquefied product is delivered to the hammer mill. A screw conveyer can be utilized for delivering asphalt roofing material to the processor. The screw conveyer can include a plurality of variable speed conveyors for regulating the flow of untreated asphalt roofing material to the treatment chamber. One or more temperature measuring devices can be disposed at the outlet of the jacketed agitated processor. Further, one or more cooling devices can be positioned between the outlet of the jacketed agitated processor and the inlet of the hammer mill for measuring and regulating temperature at the processor outlet.

DETAILED DESCRIPTION

Figure 1:
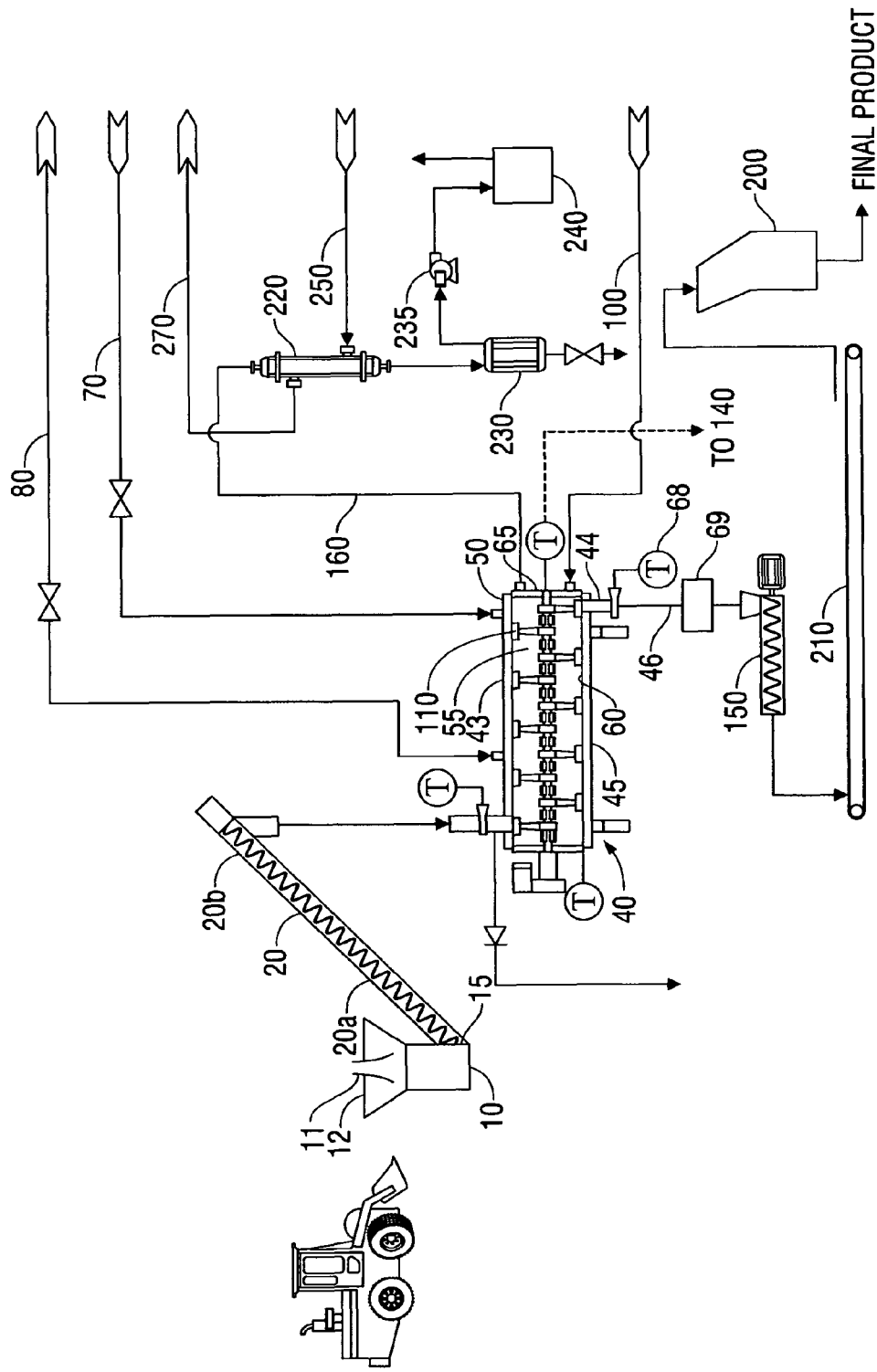
FIG. 1 is a schematic side view of equipment utilized in a specific embodiment of an asphalt shingle recycling system and method according to the invention.

Referring now to FIGS. 1-5, a preferred illustrative embodiment of an asphalt roofing shingle recycling system and method is provided. Scrap asphalt shingles are collected and deposited in hopper 10. Hopper 10 is preferably of carbon steel construction and has at least a three cubic yard storage capacity. Hopper 10 can also have hinged doors 11 at or near its top end 12 through which scrap asphalt shingles may be loaded.

The contents of hopper 10 can empty onto a screw conveyer 20 by opening bottom doors 13. Screw conveyer 20 preferably has at least a ten ton-per-hour capacity and is driven by at least a sixty horsepower variable frequency drive ("VFD") motor.

Screw conveyer 20 delivers the scrap asphalt shingles from hopper 10 to processor 40. In a preferred embodiment, processor 40 is formed of carbon steel, and includes an inlet 42 on its top end 43 for receiving the scrap asphalt shingles from screw conveyer 20. If desired, temperature reading and moisture reading devices can be installed at or near inlet 42 to allow for monitoring by a process operator. Further, screw conveyer 20 can have a dual delivery system, if desired, to prevent clogging and to feed the asphalt shingles into processor 40 in an even and consistent manner. Shingles can be loaded into hopper 10 and then pulled from hopper 10 by a short variable speed conveyor 20a that feeds onto a longer variable speed conveyor 20b. By adjusting the speeds of the two conveyors 20a and 20b, the flow of shingles into processor 40 can be regulated which will reduce or eliminate clogging.

The scrap asphalt shingles are heated in a treatment chamber 55 disposed within processor 40 until the shingles are a hot solid or are at least partially liquefied. For example, a substantial portion of the scrap asphalt can take the form of a hot solid and/or a slurry after being heated in treatment chamber 55 of processor 40.

Figure 2:
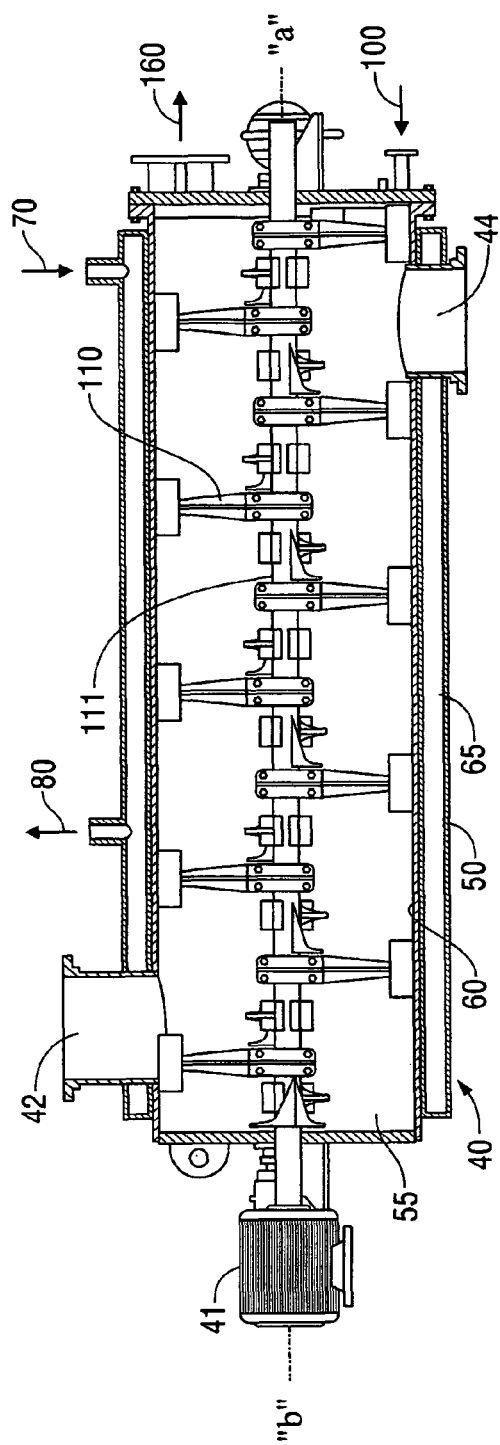
FIG. 2 is a schematic side view of a processor utilized in a specific embodiment of an asphalt shingle recycling system and method according to the invention.

Processor 40, as illustrated in the embodiment of FIGS. 1&2, is manufactured by the Dupps Company of Germantown, Ohio. Processor 40 was originally designed by the Dupps Company for rendering animal protein products. Processor 40 has been adapted according to embodiments of the present system and method to recycle asphalt shingles. For example, processor 40 can utilize hot oil instead of steam (as intended in animal protein rendering applications) as a heating source. Hot oil is preferably utilized as the heat supplying stream, due to its capacity for reaching higher temperatures than steam, although steam or other heat sources may also be utilized.

Jacket 65 at least partially surrounds processor 40. Jacket 65 preferably comprises an outer wall 50 and an inner wall 60 with a passageway formed therebetween. The hot oil circulates within the passageway of jacket 65 and flows around the exterior of processor 40. The hot oil delivers heat energy to the scrap asphalt shingles contained within treatment chamber 55 of processor 40. Jacket 65 allows for transfer of heat over a larger surface area within processor 40 than, for example, isolated heating coils or tubes.

In an illustrative embodiment, the scrap asphalt shingles are heated to a temperature in the range from 200 degrees Fahrenheit to 650 degrees Fahrenheit, more preferably about 350 degrees Fahrenheit, within treatment chamber 55 of processor 40. At these temperatures, the scrap asphalt shingles will at least partially liquefy to take the form of a slurry, which will allow the asphalt materials to flow more easily when they exit processor 40. It should be appreciated that the use of temperatures less than 350 degrees Fahrenheit produces a hot solid, while temperatures greater than 350 degrees Fahrenheit tend to at least partially liquefy the asphalt. When it is time for the hot solid to exit the processor 40, instead of using the slurry line 46, an opening in the bottom of processor 40, having the dimensions of 24 inches by 24 inches, is opened by using hinged doors (not illustrated) to allow the solid to exit the processor 40.

Figure 4:
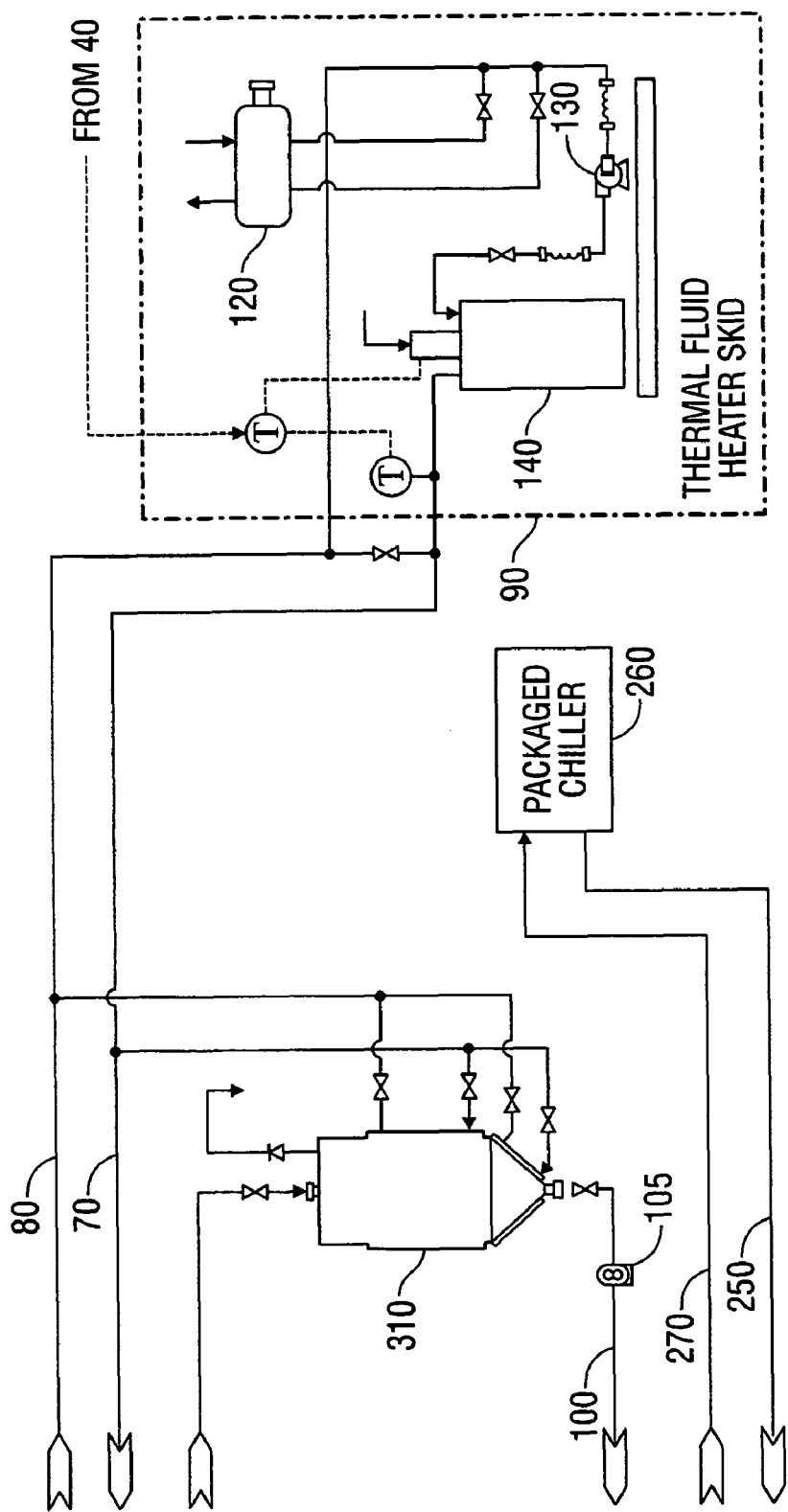
FIG. 4 is a schematic side view of additional equipment utilized in a specific embodiment of an asphalt shingle recycling system and method according to the invention.
Figure 5:
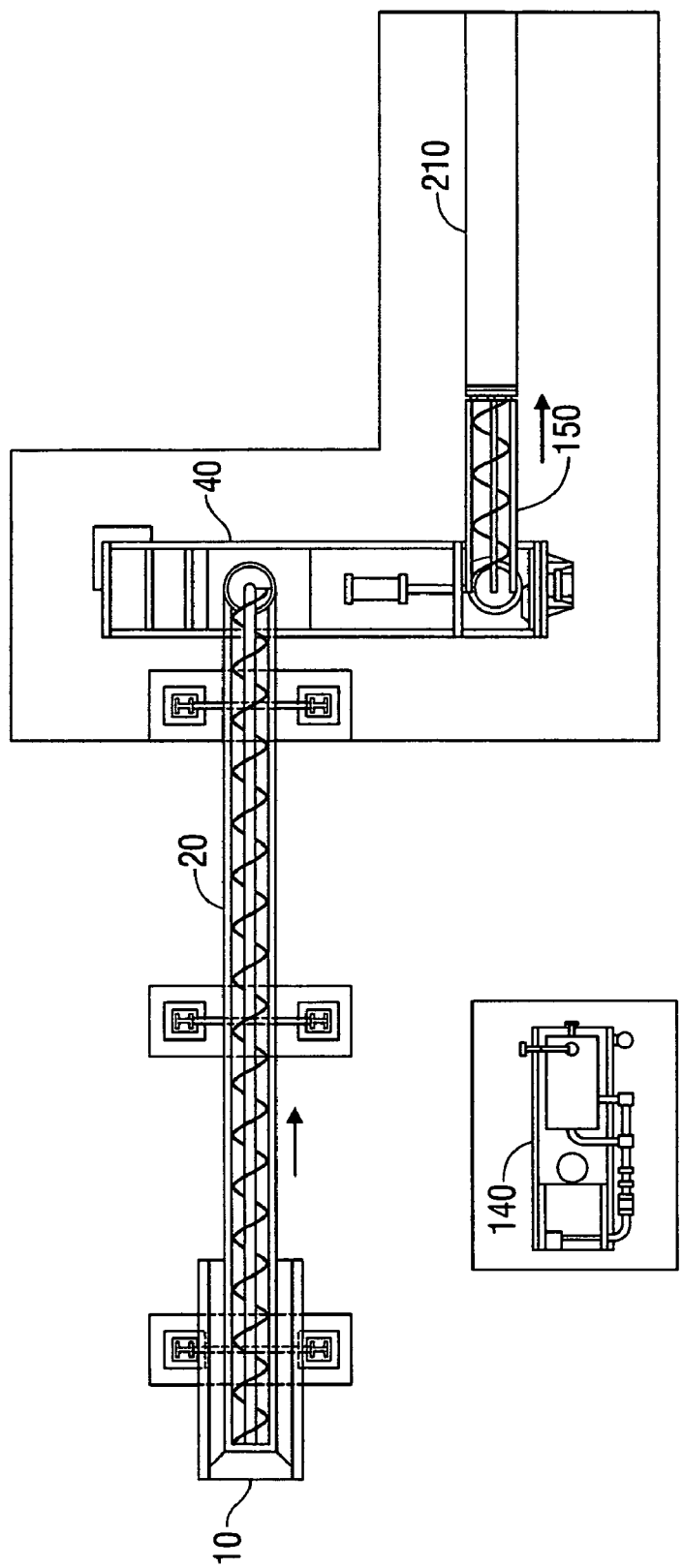
FIG. 5 is a schematic top view of additional equipment utilized in a specific embodiment of an asphalt shingle recycling system and method according to the invention.

The hot oil is initially stored in a heating tank 120, as illustrated in FIG. 4. Heating tank 120 is preferably associate with a thermal fluid heater skid 90. Skid 90 also includes a supply pump 130 and expansion tank 140 associated with heating tank 120. The hot oil is delivered to processor 40 via heat inlet stream 70 and exits processor 40 via heat outlet stream 80, and is recirculated through skid 90.

As an option, liquid asphalt additive can be added to the asphalt shingles in processor 40. The liquid asphalt additive can be, for example, virgin non-oxidized asphalt. The liquid asphalt additive further enhances the asphalt shingles in processor 40, and can affect other characteristics such as melt point. The liquid asphalt additive can be delivered to processor 40 via additive inlet stream 100 and pump 105, as illustrated in FIG. 4. The liquid asphalt additive can be heated in heater 310 prior to being introduced into processor 40.

Figure 3:
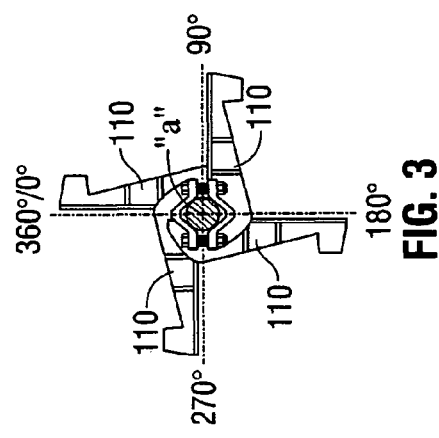
FIG. 3 is a schematic top view of an agitator arm and a plurality of paddles utilized in a specific embodiment of an asphalt shingle recycling system and method according to the invention.

In an illustrative embodiment as shown in FIGS. 2-3, the contents of treatment chamber 55 of processor 40 can be agitated in order to promote mixing. In a preferred embodiment, processor 40 includes a 75 horsepower motor 41 and an agitator arm 111 that is operationally connected to motor 41 and extends within processor 40. One or more paddles 110 are positioned along the length of agitator arm 111. Paddles 110 turn and contact the material within treatment chamber 55 of processor 40 as agitator arm 111 rotates to stir and mix the treatment chamber's contents until they are of the desired consistency. The shaft of agitator arm 111 can turn clockwise or counterclockwise (as viewed from the vantage point "a" on FIGS. 2-3) within processor 40. Preferably, shaft of agitator arm 111 turns clockwise during mixing and counterclockwise during discharge of the material from processor 40, or vice versa.

In an illustrative embodiment, processor 40 preferably does not include any milling elements to grind, crush or abrade the scrap asphalt shingles during treatment therein, as these shingles will be adequately processed by heating and/or agitation alone. Further, it is not necessary for the scrap asphalt shingles to be shredded, milled or otherwise broken apart prior to treatment in processor 40, or for liquid asphalt additive to be added to the contents of processor 40.

In general, the viscosity and consistency of the mixture in processor 40 are controlled by the temperature and pressure within processor 40 and the amount of time the mixture is treated in processor 40. The amount of liquid asphalt additive included in the mixture may also be a relevant factor, and may be varied, and adjusted as desired.

Upon heating, a certain portion of the asphalt mixture within processor 40 will take a gaseous/vapor form. This gas or vapor may also include steam or water vapor within processor 40. A gas/vapor buildup within processor 40 could increase the pressure within processor 40 to undesirable levels. Vapor outlet stream 160 in FIG. 2 can be utilized to allow these gases/vapors to exit the top of processor 40. Vapor outlet stream 160 is preferably directed to scrubber 220, which condenses the gas/vapor stream to liquid form. Scrubber 220 in FIG. 1 is cooled by a recycled glycol stream 250 which is supplied by packaged chiller 260 in FIG. 4. The glycol stream returns to packaged chiller via return stream 270. The liquid from scrubber 220 is collected in receiver 230. Alternatively, the vapor outlet stream can be cooled in a conventional cooling tower (not illustrated).

In a preferred illustrative embodiment, processor 40 includes an outlet 44 on its bottom end 45 whereby the hot solid and/or the heated scrap asphalt slurry can exit processor 40 via processor outlet stream 46 in FIG. 1. If desired, one or more infrared temperature readers or other temperature measurement devices 68 can be positioned at or near outlet 44 of processor 40 to measure and/or monitor the temperature of the exiting scrap the hot solid or the asphalt slurry. If desired, a cooling device 69 can be utilized so that the temperature of the contents of processor 40 in outlet stream 46 can be reduced such as, for example, in elevated summer temperatures. In an illustrative embodiment, cooling device 69 can accept heated shingles in the range of approximately 260 degrees F. to 280 degrees Fahrenheit and cool them down to the range of approximately 90 degrees Fahrenheit to 110 degrees Fahrenheit. Cooling device 69 can utilize water mist, fans and/or tumbling action to cool the shingles, although other cooling means may also be utilized.

Processor outlet stream 46 is ultimately directed from processor 40 to sizing unit 150. Sizing unit 150 preferably includes a 75 horsepower VFD motor and can accommodate 10,000 pounds or more per hour of materials. In a preferred embodiment, sizing unit 150 is utilized to remove any thick asphalt or other solid materials that remain in processor outlet stream 46.

After treatment in sizing unit 150, the hot solid or the heated scrap asphalt slurry is delivered to hammer mill 200 via a belt conveyer 210. Hammer mill 200 preferably includes a totally enclosed fan cooled ("TEFC") motor and can accommodate 10,000 pounds per hour of materials. The hammer mill 200 reduces the asphalt into even smaller particles, preferably able to pass through a one inch screen, or even smaller. If desired, temperature reading and moisture reading devices can be installed at or near the inlet to hammer mill 200 to allow for monitoring by a process operator.

The particles in hammer mill 200 can be formed into a desired final product. For example, the final product can be extruded, formed into a pellet, or can have the consistency of coffee grounds. Further, the particles can be allowed to harden before entering hammer mill 200 and then crushed to size.

If desired, cooling device 69 can be positioned at the entrance of hammer mill 200 in addition to, or instead of at the exit of processor 40, or alternatively, a plurality of cooling devices 69 may be utilized in the present system.

The final product can be utilized, for example, as an additive for pavement or roofing materials or as a raw material for shingle manufacturing. Additional screening, bagging and loading systems may be incorporated into the system, as necessary, depending upon the size of, and intended use for, the final product. In an embodiment, the bagging system is an automatic dual bagging system that allows for bagging at up to 20 tons per hour. Further, grease zerts can be installed on all bearings and other related items in the system to facilitate prolonged periods of use.

In the drawings and specification, there has been disclosed and described typical preferred illustrative embodiments of the invention, and although specific terms are employed, the terms are used in a descriptive sense only and not for purposes of limitation. It will be apparent that various modifications and changes can be made within the spirit and scope of the invention as described in the foregoing specification. Accordingly, the invention is therefore to be limited only by the scope of the appended claims.

What is claimed is:

1. An apparatus for recycling asphalt roofing material, the apparatus comprising:
    a jacketed agitated processor for heating the asphalt roofing material to produce a partially liquefied product;
    a heating skid for supplying a heat source to the jacket of the agitated processor;
    a sizing unit for reducing the particle size of solid particles present in the partially liquefied product before the partially liquefied product is delivered to the hammer mill;
    a hammer mill external to said agitated processor for further reducing the particle size of solid particles present in the partially liquefied product;
    a screw conveyor for delivering asphalt roofing material to the processor, said screw conveyor comprising a plurality of variable speed conveyors for regulating the flow of untreated asphalt roofing material to the treatment chamber.

2. The apparatus of claim 1, further comprising one or more temperature measuring devices disposed at the outlet of the jacketed agitated processor.

3. The apparatus of claim 1, further comprising one or more cooling devices between the outlet of the jacketed agitated processor and the inlet of the hammer mill.

4. An apparatus for recycling asphalt roofing material, the apparatus comprising:
    a jacketed agitated processor for heating the asphalt roofing material to produce a hot solid product;
    a heating skid for supplying a heat source to the jacket of the agitated processor;
    a sizing unit for reducing the particle size of solid particles present in the hot solid product before the hot solid product is delivered to the hammer mill;
    a hammer mill external to said agitated processor for further reducing the particle size of solid particles present in the hot solid product;
    a screw conveyor for delivering asphalt roofing material to the processor, said screw conveyor comprising a plurality of variable speed conveyors for regulating the flow of untreated asphalt roofing material to the treatment chamber.

5. The apparatus of claim 4, further comprising one or more temperature measuring devices disposed at the outlet of the jacketed agitated processor.

6. The apparatus of claim 4, further comprising one or more cooling devices between the outlet of the jacketed agitated processor and the inlet of the hammer mill.

\* \* \* \* \*